No. 645,821. Patented Mar. 20, 1900.
L. F. LONGMORE.
DISINFECTING DEVICE.
(Application filed June 10, 1899.)
(No Model.)
Fig. 2.
Fig. 1.
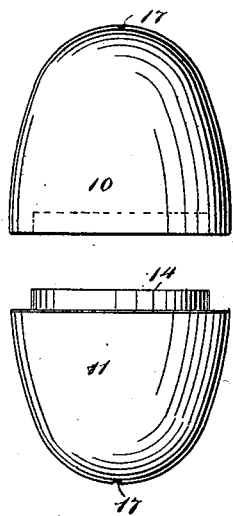
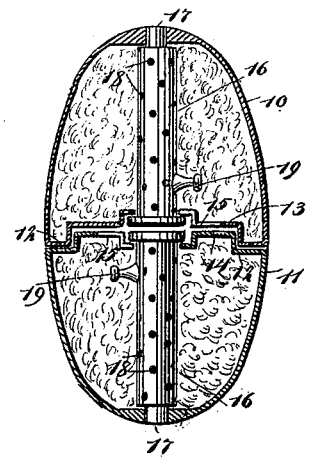
Fig. 3.
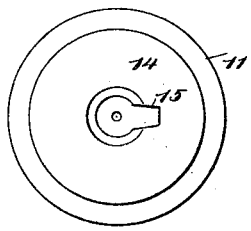
WITNESSES:
Chas. Nida.
J.W. Hanaford
INVENTOR
Lewis F. Longmore
BY
ATTORNEYS.

UNITED STATES PATENT OFFICE.

LEWIS F. LONGMORE, OF LOWELL, MASSACHUSETTS, ASSIGNOR TO ALBERTO SMITHSON AND CHARLES DAGGETT, OF DRACUT, MASSACHUSETTS.

DISINFECTING DEVICE.

SPECIFICATION forming part of Letters Patent No. 645,821, dated March 20, 1900.

Application filed June 10, 1899. Serial No. 720,054. (No model.)

*To all whom it may concern:*

Be it known that I, LEWIS F. LONGMORE, of Lowell, in the county of Middlesex and State of Massachusetts, have invented certain new and useful Improvements in Disinfecting Bodies, of which the following is a full, clear, and exact description.

My invention relates to improvements in that class of disinfecting bodies which are adapted to contain a disinfectant and emit it in the form of vapor and which are especially adapted for keeping lice and other vermin off fowls, but which may also be used for other disinfecting purposes.

The object of my invention is to produce an extremely-simple device of this kind which I make, preferably, in the form of a nest-egg, which may be easily filled with a disinfectant, which is provided with an absorbent adapted to hold the disinfectant, and which is constructed in such a way that the disinfectant will be evaporated sufficiently fast for ordinary disinfecting purposes and will yet last a comparatively-long time.

To these ends my invention consists in certain features of construction and combinations of parts, as will be hereinafter described and claimed.

Reference is to be had to the accompanying drawings, forming a part of this specification, in which similar figures of reference indicate corresponding parts in all the views.

Figure 1 is a longitudinal section of the nest-egg, showing my improvements. Fig. 2 is a detail plan view of the egg with its end sections separated, and Fig. 3 is an inside elevation of one of the end sections.

The egg is made of the usual shape and comprises two substantially-similar end sections 10 and 11, each constituting approximately one-half of the egg, and each has at its larger end a transverse partition 12, the partition of one being adapted to abut with the partition of the other. The middle portion of one partition is depressed, as shown at 13, and the middle portion of the opposite partition is correspondingly protruded, as shown at 14, so that the protruding part of one section will enter the recess of the opposing section, and this will bring the edges of the two sections close together, and by placing plaster-of-paris or other suitable cement between the two parts and then pressing them together the two sections are firmly united and form a smooth egg of the same exterior appearance as the ordinary nest-egg. The partitions 12 are provided with openings 15, which permit the shells 10 and 11 to be filled, and they also permit the bosses on the evaporating-tubes to be inserted, as hereinafter described.

The sections or shells 10 and 11 are filled with cotton or other absorbent material, and each is provided with a central longitudinal tube 16, which opens through the end of the sections, as shown at 17. The tubes are open at their inner ends, but may be closed by small stoppers, if desired. Each tube is provided with numerous perforations 18, through which the vapor from the disinfecting material may pass, and each tube is also provided with a nipple or boss 19, through which the vapor may also pass. When the tube is inserted, the nipple or boss is pushed through the opening 15 in the partition, and the partition is also provided with a central opening to receive the tube.

The shells or sections 10 and 11 are filled with cotton or other absorbent and then saturated with a liquid disinfectant, after which the two sections are fastened together in the manner described and the egg is then ready for use. The disinfectant evaporates and the vapor passes slowly through the bosses or nipples 19 and the perforations 18 and finally issues from the outer ends of the tubes, so as to exert its influence on the surrounding parts.

I have shown and described my invention as applied to an egg; but it will be understood that the principle of the invention is the same, even though the body be other than egg-shaped.

Having thus described my invention, I claim as new and desire to secure by Letters Patent—

1. A disinfecting body, comprising separable hollow sections adapted to contain a disinfectant, and a perforated tube arranged longitudinally in each section and opening through the end wall thereof, substantially as described.

2. A disinfecting body, comprising separable hollow sections adapted to contain a disinfectant, each section being provided with an apertured partition, and a perforated central tube in each section, each tube extending from the partition to the end of the section and opening through the same, substantially as described.

3. A disinfecting body, comprising separable hollow sections adapted to hold a disinfectant and provided with abutting partitions, one partition being provided with a recess and the other with a protuberance to enter said recess and a perforated tube leading through each section and opening through the wall thereof, substantially as described.

4. A disinfecting body, comprising two separable hollow sections having bottom-apertured partitions, one partition being depressed to form a recess and the other being formed into a projection to enter the recess, and perforated tubes arranged longitudinally in the sections and opening through the end walls thereof, substantially as described.

5. A disinfecting body, comprising separable hollow sections having abutting partitions and adapted to hold a disinfectant, said partitions being centrally apertured and tubes extending longitudinally through the sections and opening through the end walls thereof, the tubes having perforations therein and also projecting nipples, substantially as described.

In testimony whereof I have affixed my signature in presence of two witnesses.

LEWIS F. LONGMORE.

Witnesses:
ALBERT M. MOORE,
CALROW L. STANLEY.